(12) United States Patent
Brandl et al.

(10) Patent No.: US 7,290,344 B2
(45) Date of Patent: Nov. 6, 2007

(54) BODY HAVING ANGLE SCALING

(75) Inventors: Sebastian Brandl, Altenmarkt (DE); Juergen Hertenberger, Bodenkirchen/Aich (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 160 days.

(21) Appl. No.: 11/286,185

(22) Filed: Nov. 23, 2005

(65) Prior Publication Data
US 2006/0110885 A1  May 25, 2006

(30) Foreign Application Priority Data
Nov. 24, 2004  (DE)  ...................... 10 2004 056 671

(51) Int. Cl.
*G01B 11/26*  (2006.01)
(52) U.S. Cl. ............................ 33/1 PT; 33/1 N; 33/708
(58) Field of Classification Search ................ 33/1 PT, 33/1 N, 706–708, 762, 763
See application file for complete search history.

(56) References Cited

U.S. PATENT DOCUMENTS 6,922,899 B2 *  8/2005  Nakamura et al. .......... 33/1 PT 2005/0235502 A1 *  10/2005  McMurtry et al. .......... 33/1 PT

FOREIGN PATENT DOCUMENTS

| DE | 199 36 237 | 2/2001 |
| EP | 0 664 441 | 7/1995 |
| EP | 1 457 762 | 9/2004 |

OTHER PUBLICATIONS

Heidenhain Prospekt "Winkelmessgerate", Feb. 2004.

* cited by examiner

*Primary Examiner*—Yaritza Guadalupe-McCall
(74) *Attorney, Agent, or Firm*—Kenyon & Kenyon LLP

(57) ABSTRACT

A monolithic body having angle scaling is rotatable about an axis to measure the rotational position of a machine part. The body has a first annular region which has a flange-type configuration for connection to the machine part, and a second annular region on which the angle scaling is arranged, as well as a crosspiece region. The crosspiece region is arranged between the first annular region and the second annular region. The crosspiece region has a geometrical extension in the direction of the axis which is at least three times smaller than the greatest geometrical extension of the second annular region in the direction of the axis (Z).

18 Claims, 4 Drawing Sheets

BODY HAVING ANGLE SCALING

CROSS-REFERENCE TO RELATED APPLICATIONS

The present application claims priority to Application No. 10 2004 056 671.2, filed in the Federal Republic of Germany on Nov. 24, 2004, which is expressly incorporated herein in its entirety by reference thereto.

FIELD OF THE INVENTION

The present invention relates to a body having angle scaling, which may be used as carrier for a material measure in angle-measurement systems, for example.

BACKGROUND INFORMATION

Such angle-measurement systems may be used to measure rotary motions or rotational positions of a machine part, such as a shaft, on which a body having angle scaling is affixed in a torsionally fixed manner. The angle scaling may have, for example, an optical or magnetic graduation which may be scanned accordingly. The rotary motion is recorded either incrementally or absolutely. The output measured value is, for example, a sequence of counting pulses, a counter value or a code word. Corresponding angle-measurement systems may be used in so-called pick-and-place machines in the manufacture of electronic components, or in machine tools for the measuring of rotary movements. The reproducibility or repeatability of the measurement of rotational angles of machine parts down to precisely only a few angular seconds is considered to be important when working with the extremely dynamic pick-and-place machines, for example. In particular, the absolute accuracy of the measuring results of an angle-measurement system is considered to be crucial for machine tools. Angle-measurement systems are often designed such that they have no separate mounting of the components that are rotatable relative to each other.

The precision of an angle measurement is influenced to a considerable extent by the quality of the angle scaling, the contouring accuracy of the body bearing the angle scaling and by the deviation in the radial eccentricity of the mounting. Also considered to be important in this context is that the smallest possible eccentricity of the body with respect to the mounting is achieved. Furthermore, in particular in applications involving high dynamics, such bodies should be joined to the corresponding machine part in an extremely rigid manner and, in addition, the body itself should be designed as a rotationally or torsionally stiff body, if possible, to allow precise measuring results to be achieved.

In the brochure entitled "Angle Measuring Devices" of HEIDENHAIN of February 2004, an installable angle measuring device (type ERA or ERM) which has a graduation drum arranged as monolithic body is illustrated on page 23. An inner annular region of this graduation drum has a flange-type arrangement for connection to a shaft.

Conventional devices are believed to have certain disadvantages, such as that relatively high demands may need to be placed on the mounting surface, for example, on the front face of a shaft and/or clamping surface of the body, in order for the measuring results or the measuring signals not to deteriorate.

SUMMARY

Example embodiments of the present invention may provide a body having an angle scaling to measure the rotational position of a machine part, such body providing excellent measuring results even in the presence of relatively large dimensional tolerances of the machine part or the clamping surface of the body.

The body having the angle scaling may have a monolithic design and may be used to measure the rotational position or rotary motion of a machine part about an axis. The body has a first annular region and a second annular region, as well as a crosspiece region. The first annular region has a flange-type arrangement for connection with the machine part. The angle scaling is arranged on the second annular region. Relative to a radially aligned line, the crosspiece region is arranged between the first annular region and the second annular region. In the axial direction, the crosspiece region has a geometrical extension $d_3$ that is at least three times smaller than the greatest geometrical extension $d_2$ of the second annular region in the axial direction. Therefore, the following conditions apply: $d_3 \leq \frac{1}{3} d_2$ or $d_2/d_3 \geq 3$.

Compared to conventional bodies, the bodies having the angle scaling hereof may make it possible to achieve considerably better measuring results, for example, when the mounting surfaces of the machine parts have relatively imprecise mounting surfaces. Measuring errors due to deformations—even slight ones—may occur in conventional bodies in the axial direction (wobble) and in the region of the angle scaling in the radial direction. In bodies hereof, the geometrical design of the crosspiece region relative to the second annular region may minimize the determinative deformations of the second annular region having the angle scaling. Despite the implemented changes, in particular notwithstanding reductions in the cross section, the torsional stiffness of the body itself may not be affected such that poorer measuring accuracy result. As mentioned, compared to conventional measurement systems, the measuring accuracy may be improved with mounting surfaces having relatively imprecise tolerances.

The term monolithic should be understood to denote that such a body is made up of one piece, so that it may be produced at relatively low cost with the aid of a turning process, for example, from a steel or aluminum semi-finished material.

The first annular region is arranged such that it is able to be joined to a machine part, for example, a shaft end, in a flange-like manner. Flanges allow the assembly of two machine parts by applying axially directed locating forces. To this end, flanges may have boreholes, which are arranged at an offset along a circular curve, through which affixation device(s), such as screws, engage, so that axially directed holding or fixation forces are able to be generated relative to the machine part in question.

The angle scaling may be arranged on or applied to the second angular region directly, for example, in that the scale graduations are inscribed on the second annular region, e.g., directly on the body, with the aid of a laser ablation process or a lithography method, etc. However, as an alternative thereto, it is also possible to imprint the angle scaling on the body in the second angular region. An optical method for scanning the angle scaling may be provided for both variants. However, a magnetic graduation may be arranged on the second angular region as the angle scaling.

Example embodiments of the present invention also include devices in which the angle scaling is arranged on the second annular region as a self-contained component, for example, as a measuring line.

The crosspiece region may have a geometrical extension in the axial direction that is at least five times smaller ($d_2/d_3 \geq 5$), e.g., ten times smaller ($d_2/d_3 \geq 10$), than the greatest geometrical extension of the second annular region in the direction of the axis. The crosspiece region may have a geometrical extension in the axial direction that is at least fifteen times smaller than the greatest geometrical extension of the second annular region in the direction of the axis ($d_2/d_3 \geq 15$).

In order for the body to have sufficient stiffness, for example, for its manufacturing process, geometrical extension $d_1$ of the first annular region may be greater than geometrical extension $d_3$ of the crosspiece region. Geometrical extension $d_3$ of the crosspiece region in the axial direction thus is less than the geometrical extension of the first annular region ($d_3 < d_1$).

The angle scaling may be applied outside on a lateral side of a cylindrical, e.g., a hollow-cylindrical, or annular body.

The body may be formed as relatively slender annular body. Due to their flexural softness, the response of such annular bodies to inaccuracies of the mounting surface of the machine part in question or with respect to inaccuracies in the clamping surface of the body itself may be especially sensitive. For annular bodies in which the ratio of the outer diameter to the inner diameter is smaller than 5, e.g., smaller than 3, e.g., smaller than 2, the method hereof may be particularly suitable.

If the rotational position of a machine part is able to be measured across a full rotation or across multiple rotations, the first annular region and the second annular region as well as the crosspiece region may have a geometry that encompasses 360°. The annular body is thus designed as closed ring.

However, it should be understood that example embodiments of the present invention are not restricted to closed bodies having a cylindrical or ring-shaped design. For example, the body may also take the form of a ring segment, e.g., if the rotational position of a machine part will not have to be measured across a full revolution of the machine part.

Example embodiments of the present invention may provide that the mounting surface of the machine part to which the body having the angle scaling is to be affixed may have a relatively high measuring tolerance, e.g., with respect to its evenness, without detrimental effect on the measuring results of the rotational position of the machine part. In addition, the body having angle scaling may have a lower mass moment of inertia at high torsional stiffness and, as a result, may particularly suitable for applications in which high angular accelerations occur. Furthermore, the corresponding body may be easy to manufacture at relatively low cost.

According to an example embodiment of the present invention, a device includes a monolithic body including an angle scaling, the body rotatable about an axis to measure a rotational position of a machine part, the body including a first annular region adapted to connect with the machine part, a second annular region on which the angle scaling is arranged, and a cross-piece region arranged between the first annular region and the second annular region, the crosspiece region having a geometrical extension in a direction of the axis that is at least three times smaller than a greatest geometrical extension of the second annular region in the direction of the axis.

The first annular region may be arranged as a flange.

The geometrical extension of the crosspiece region in the direction of the axis may be at least five times smaller than the greatest geometrical extension of the second annular region in the direction of the axis.

The geometrical extension of the crosspiece region in the direction of the axis may be at least ten times smaller than the greatest geometrical extension of the second annular region in the direction of the axis.

The angle scaling may be arranged on a lateral side of the second annular region.

The first annular region may have a clamp surface.

The clamp surface may be located in a geometrical plane that is arranged orthogonally with respect to the axis.

The geometrical plane of the clamp surface may intersect a centroid of the cross-sectional area of the body.

The geometrical extension of the crosspiece region in the direction of the axis may be smaller than a geometrical extension of the first annular region in the direction of the axis.

A geometry of the first annular region, the second annular region and the crosspiece region may encompass 360°.

A geometry of a cross-section of the crosspiece region may be symmetrical with respect to a radially aligned line.

A geometry of a cross-section of each of the first annular region and the crosspiece region may be symmetrical with respect to a radially aligned line.

The first annular region may be adapted to affix the body on the machine part by at least one affixation device oriented in the direction of the axis.

The device may include at least one affixation device adapted to affix the body on the machine part via the first annular region.

The angle scaling may be applied directly on the second annular region.

The angle scaling may be applied on the second annular region by one of (a) a laser ablation process and (b) a lithographic method.

The body may have an outer diameter and an inner diameter, and a ratio of the outer diameter to the inner diameter may be smaller than 5.

According to an example embodiment of the present invention, a system includes: a rotatable machine part; and a monolithic body including an angle scaling, the body rotatable about an axis to measure a rotational position of the machine part, the body including a first annular region connected with the machine part, a second annular region on which the angle scaling is arranged, and a cross-piece region arranged between the first annular region and the second annular region, the crosspiece region having a geometrical extension in a direction of the axis that is at least three times smaller than a greatest geometrical extension of the second annular region in the direction of the axis.

Further aspects and details of the body having the angle scaling according to example embodiments of the present invention are described in more detail below with reference to the appended Figures.

DETAILED DESCRIPTION

Figure 1:
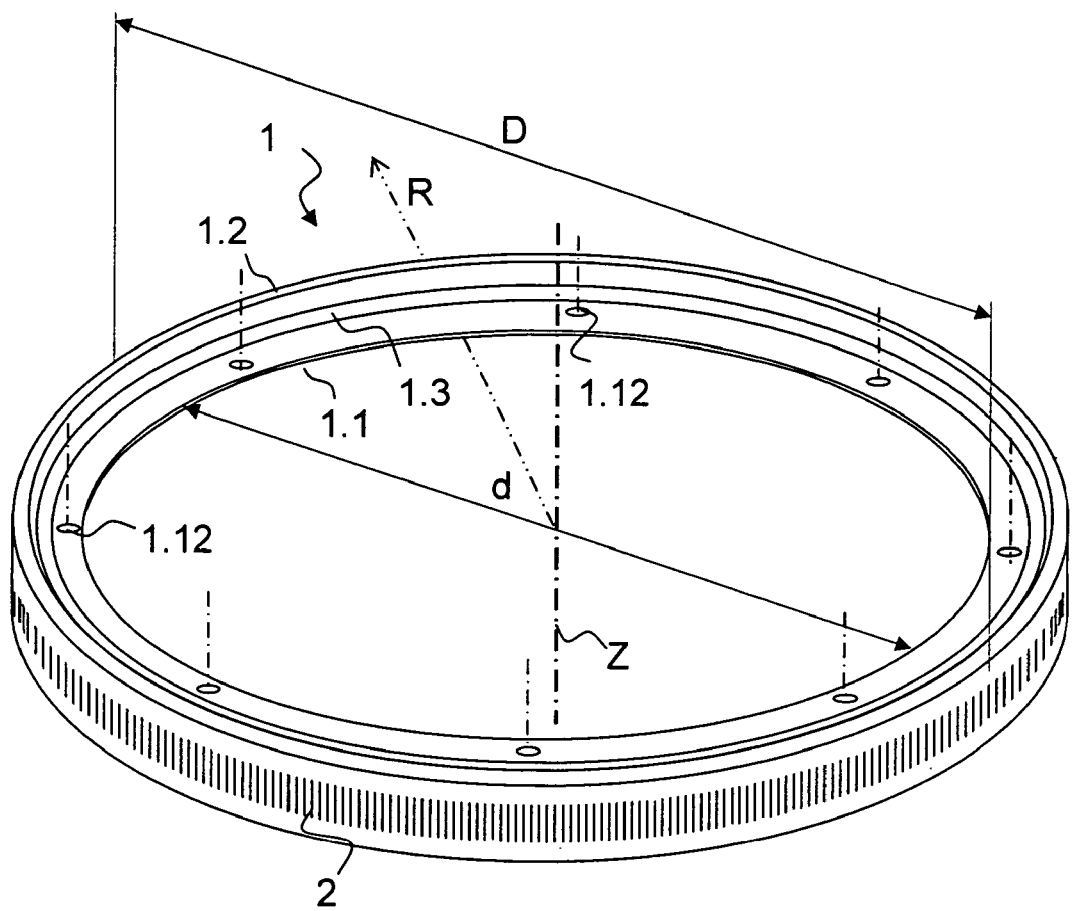
FIG. 1 is a perspective view of a body having angle scaling according to an example embodiment of the present invention.

As illustrated in FIG. 1, a body hereof is arranged as annular body 1. This annular body 1 has a first annular region 1.1, a second annular region 1.2 and a crosspiece region 3, crosspiece region 1.3 being arranged between first annular region 1.1 and second annular region 1.2 relative to a radially aligned line R. First annular region 1.1 has a flange-type design and includes boreholes 1.12, which are arranged along a circular curve at a uniform angular offset.

Arranged on the outer lateral side of second annular region 1.2 is an angle scaling 2. In the example embodiment illustrated, angle scaling 2 is applied directly on the annular body using a laser ablation process. To this end, the outer lateral side of second annular region 1.2 is coated with a special layer and an individual graduation ablation is performed.

However, as an alternative thereto, it is also possible to arrange an angle scaling 2 on an end face or on the inner lateral surface of second annular region 1.2.

Angle scaling 2 is arranged such that a rotational position about an axis Z of annular body 1 is detectable, e.g., that the markings of angle scaling 2 show an offset in the circumferential or rotational direction when the annular body is rotated about axis Z. In the example embodiment illustrated, angle scaling 2 is arranged to allow optical scanning of angle scaling 2. As an alternative thereto, it is also possible to apply a magnetic scanning principle by using a corresponding magnetic angle scaling or graduation.

Annular body 1 has an outer diameter D and an inner diameter d. Outer diameter D may be 250 mm, and inner diameter d may be 220 mm, resulting in the ratio D/d=250/220, i.e., 1.14. Annular body 1 may be produced as precisely as possible with the aid of a turning or grinding method, so that the lateral side has a relatively low circularity deviation. For annular bodies 1 that have a relatively large inner opening compared to outside diameter D, i.e., a large inner diameter d (D/d comparatively small), the minimally producible circularity deviations may be limited because such annular bodies 1 may be easily deformable due to their slender design. For example, interfering deformations leading to dimensional deviations of finished annular body 1 may thus already come about by clamping such annular bodies 1 into a processing machine. On the other hand, certain applications of angle-measurement systems, for example, for pick-and-place machines, specifically call for lightweight, and therefore also slender annular bodies 1 in order to achieve a corresponding dynamic performance during operation of such pick-and-place machines, for example.

Figure 2A:
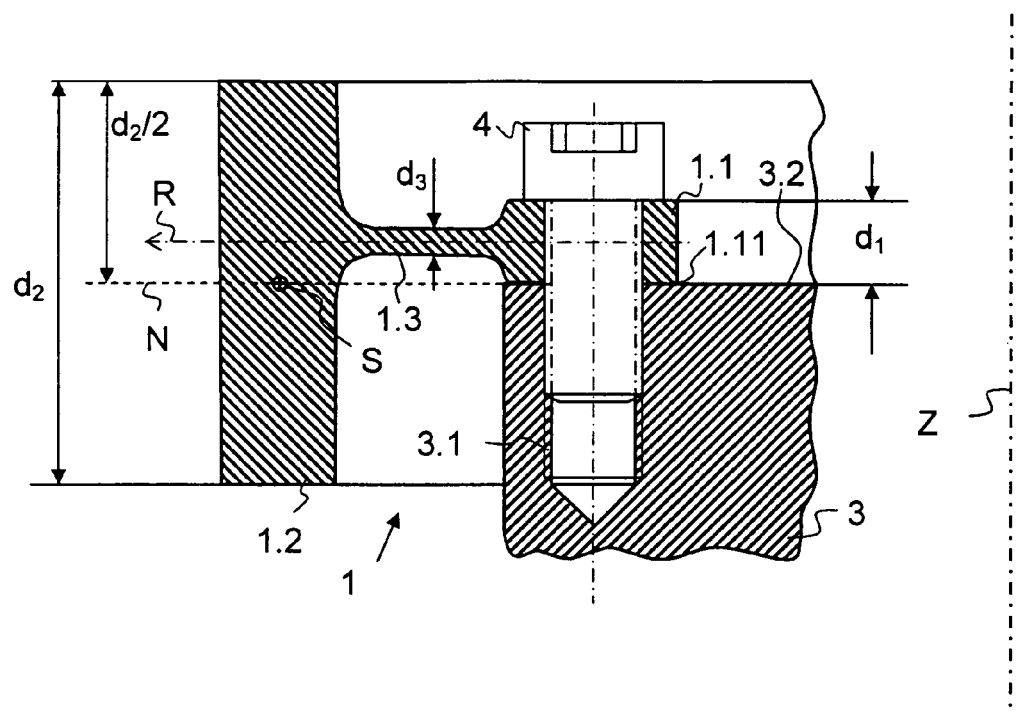
FIG. 2a is a partial cross-sectional view in the radial direction through a body in an attached state.

FIG. 2a is a partial cross-sectional view, in the radial direction, through annular body 1 and a machine part, which is a shaft 3 in the exemplary embodiments illustrated. In order to minimize the aforementioned deformations during production of annular body 1, first annular region 1.1 may have a thicker design than crosspiece region 1.3 so as to reinforce it. Crosspiece region 1.3 thus has a smaller geometrical extension $d_3$ in the direction of axis Z than the geometrical extension $d_1$ of first annular region 1.1.

Especially important for precise measuring results of a corresponding angle-measuring system may be that geometrical extension $d_3$ of crosspiece region 1.3 is smaller in the direction of axis Z than that of second annular region 1.2. The absolute geometrical extensions in the exemplary embodiment illustrated are $d_1$=0.8 mm, $d_2$=12 mm, $d_3$=0.5 mm. This means that, in the direction of axis Z, crosspiece region 1.3 has a geometrical extension $d_3$ which is 24 times smaller than the greatest geometrical extension $d_2$ of second annular region 1.2 in the direction of axis Z. As a result, the conditions $d_3 \leq \frac{1}{24}d_2$ or $d_2/d_3 \geq 24$ are satisfied. Furthermore, in the exemplary embodiment illustrated, crosspiece region 1.3 is the thinnest region of annular body 1 ($d_3 < d_1 < d_2$).

Crosspiece region 1.3 is centrically arranged relative to first annular region 1.1 in the Z direction. This arrangement is illustrated in FIG. 2a where radially aligned line R centrically penetrates both first annular region 1.1 and crosspiece region 1.3, i.e., radially aligned line R corresponds to the axis of symmetry. In other words, first annular region 1.1 and crosspiece region 1.3 are arranged such that their cross-sections are symmetrical with respect to radially aligned line R. In addition, crosspiece region 1.3 itself is also formed such that its cross-section by itself has a geometry that is symmetrical with respect to radially aligned line R. This arrangement of crosspiece region 1.2 may be particularly suitable for optimizing the measuring results in the angle-measurement device.

The cross-sectional area of annular body 1 has a centroid S. In the exemplary embodiment illustrated, the position of centroid S may be formed based on the individual centroids of the essentially rectangular regions (first annular region 1.1, second annular region 1.2, crosspiece region 1.3). Since first annular region 1.1 has the greatest cross-sectional area, centroid S comes to lie near the center of the cross-sectional area of first annular region 1.1.

Figure 2B:
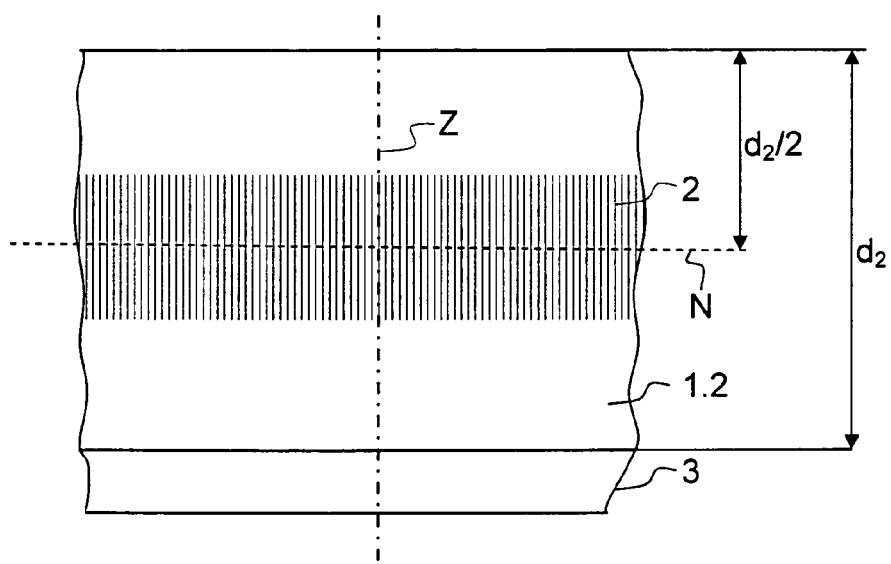
FIG. 2b is a partial side view of the body having angle scaling, in the attached state.

Plane N, which is formed by clamping surface 1.11, extends through centroid S in the radial direction. Plane N thus is arranged in the plane in which the neutral fibers of annular body 1 extend. Angle scaling 2 may be arranged such that plane N intersects angle scaling 2 centrically (FIG. 2b).

Shaft 3, whose rotational position is ultimately to be determined, is rotatable about axis Z and has an end face 3.2 which has uneven regions within the framework of the predefined measuring tolerances. Tap holes 3.1, which are arranged in the same pattern as boreholes 1.12 of first annular region 1.1, are provided in shaft 3.

When annular body 1 is mounted, first annular region 1.1, i.e., its clamping surface 1.11, is placed on end face 3.2 of shaft 3. Clamping surface 1.11 is located in a geometrical plane that is arranged orthogonally to axis Z, boreholes 1.12 of first annular region 1.1 penetrating clamping surface 1.11 in the vertical direction (parallel to axis Z).

After the placement of annular body 1, it will be centered with respect to shaft 3. Clamping surface 1.11 of first annular region 1.1 is subsequently pressed against end face 3.2 of shaft 3 by tightening screws 4 which are used as an affixation device. The orientation of boreholes 1.12 is parallel to axis Z. Thus, first annular region 1.1 is formed such that annular body 1 is affixed on shaft 3 by screws 4, the fixation force generated in this manner being directed toward axis Z. That is, annular body 1 is joined to shaft 3 by first annular region 1.1 which is formed as a flange.

Due to the production-related uneven areas both on end face 3.2 of shaft 3 and on clamping surface 1.11 of first annular region 1.1, first annular region 1.1 geometrically adapts to the uneven areas and deforms correspondingly when screws 4 are tightened. However, this deformation does not cause any significant radial or axial deformation of relatively rigid second annular region 1.2 and angle scaling 2 arranged thereon. To further minimize mounting-related-related deformations of annular body 1, and second annular region 1.2, in particular, clamping surface 1.11 or mounting area 3.2 may be arranged in plane N of the neutral fibers. Because of relatively thin crosspiece region 1.3, no impermissibly large radial deformations and also no impermissibly large wobble may be transmitted into the region of angle scaling 2 although crosspiece region 1.3 may show relatively large deformations. This notwithstanding, annular body 1 exhibits quite high torsional stiffness and may thus be used in angle-measuring devices that are utilized in highly dynamic machines and satisfy high demands on precision.

Figure 3:
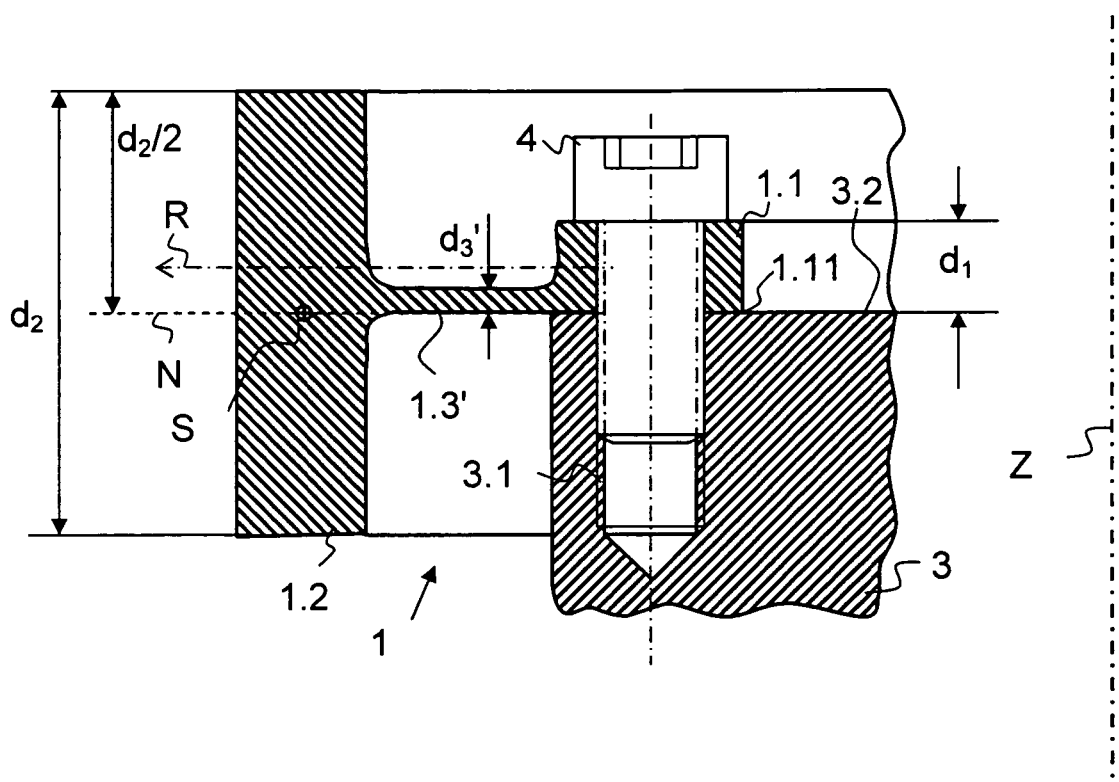
FIG. 3 is a partial cross-sectional view in the radial direction through a body in the attached state.

FIG. 3 illustrates an exemplary embodiment of an annular body 1. Crosspiece region 1.3' of annular body 1 has a geometry that differs from that described above. The arrangement illustrated in FIG. 3 may allow crosspiece region 1.3' to be produced at relatively low cost. The lower annular area of crosspiece region 1.3' is arranged in the same plane as clamping surface 1.11, so that a continuous annular surface is able to be produced in the turning process. Only on the upper side of crosspiece region 1.3' will a groove have to be introduced by turning in order to ultimately achieve the small geometrical extension $d_3'$ of crosspiece region 1.3' in the direction of axis Z compared to geometrical extension $d_2$ of second annular region 1.2. In the exemplary embodiment illustrated in FIG. 3, the absolute geometrical extension may be dimensioned as follows: $d_1=0.8$ mm; $d_2=12$ mm; $d_3'=0.5$ mm. That is to say, in the direction of axis Z, crosspiece region 1.3' has a geometrical extension $d_3'$ that is approximately 24 times smaller than the greatest geometrical extension $d_2$ of second annular region 1.2 in the direction of axis Z ($d_3' \leq \frac{1}{24} \times d2$, or $d_2/d_3' \geq 24$).

Figure 4:
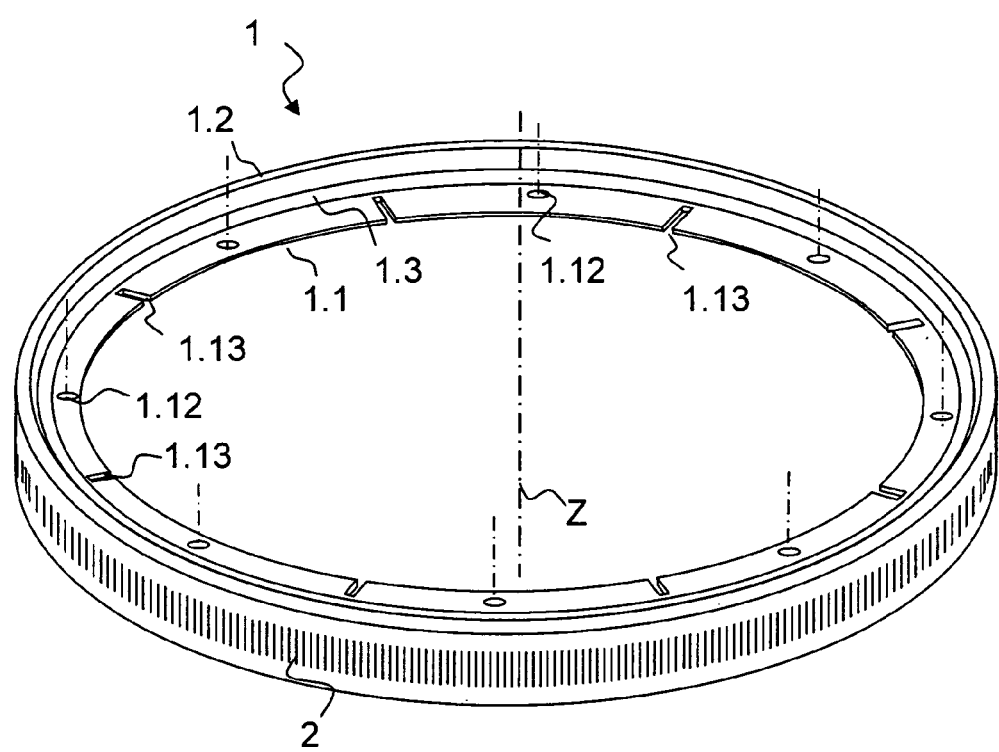
FIG. 4 is a perspective view of a body having angle scaling.

An exemplary embodiment of the present invention is illustrated in FIG. 4. In this exemplary embodiment, first annular region 1.1 has slots 1.13 through which annular body 1 is able to adapt to, e.g., uneven areas on shaft 3 in the direction of axis Z without this causing impermissible radial or axial deformations in the region of angle scaling 2. As illustrated in FIG. 4, slots 1.13 are radially aligned and open toward the center of annular body 1. However, as an alternative thereto, it is also possible to provide cutouts in first annular region 1.1 which have a closed contour, e.g., elongated holes. This may allow the torsional stiffness about axis Z to be increased compared to an arrangement having open slots 1.13.

Furthermore, example embodiments of the present invention also include bodies in which slots 1.13 or corresponding cutouts having an open or closed contour penetrate not only first annular region 1.1 but crosspiece region 1.3 as well.

What is claimed is:

1. A device, comprising:
a monolithic body including an angle scaling, the body rotatable about an axis to measure a rotational position of a machine part, the body including a first annular region adapted to connect with the machine part, a second annular region on which the angle scaling is arranged, and a cross-piece region arranged between the first annular region and the second annular region, the crosspiece region having a geometrical extension in a direction of the axis that is at least three times smaller than a greatest geometrical extension of the second annular region in the direction of the axis.

2. The device according to claim 1, wherein the first annular region is arranged as a flange.

3. The device according to claim 1, wherein the geometrical extension of the crosspiece region in the direction of the axis is at least five times smaller than the greatest geometrical extension of the second annular region in the direction of the axis.

4. The device according to claim 3, wherein the first annular region has a clamp surface.

5. The device according to claim 4, wherein the clamp surface is located in a geometrical plane that is arranged orthogonally with respect to the axis.

6. The device according to claim 5, wherein the geometrical plane of the clamp surface intersects a centroid of the cross-sectional area of the body.

7. The device according to claim 1, wherein the geometrical extension of the crosspiece region in the direction of the axis is at least ten times smaller than the greatest geometrical extension of the second annular region in the direction of the axis.

8. The device according to claim 1, wherein the angle scaling is arranged on a lateral side of the second annular region.

9. The device according to claim 1, wherein the geometrical extension of the crosspiece region in the direction of the axis is smaller than a geometrical extension of the first annular region in the direction of the axis.

10. The device according to claim 1, wherein a geometry of the first annular region, the second annular region and the crosspiece region encompasses 360°.

11. The device according to claim 1, wherein a geometry of a cross-section of the crosspiece region is symmetrical with respect to a radially aligned line.

12. The device according to claim 1, wherein a geometry of a cross-section of each of the first annular region and the crosspiece region is symmetrical with respect to a radially aligned line.

13. The device according to claim 1, wherein the first annular region is adapted to affix the body on the machine part by at least one affixation device oriented in the direction of the axis.

14. The device according to claim 1, further comprising at least one affixation device adapted to affix the body on the machine part via the first annular region.

15. The device according to claim 1, wherein the angle scaling is applied directly on the second annular region.

16. The device according to claim 1, wherein the angle scaling is applied on the second annular region by one of (a) a laser ablation process and (b) a lithographic method.

17. The device according to claim 1, wherein the body has an outer diameter and an inner diameter, a ratio of the outer diameter to the inner diameter smaller than 5.

18. A system, comprising:
a rotatable machine part; and
a monolithic body including an angle scaling, the body rotatable about an axis to measure a rotational position of the machine part, the body including a first annular region connected with the machine part, a second annular region on which the angle scaling is arranged, and a cross-piece region arranged between the first annular region and the second annular region, the crosspiece region having a geometrical extension in a direction of the axis that is at least three times smaller than a greatest geometrical extension of the second annular region in the direction of the axis.

* * * * *